(12) United States Patent
Horne et al.

(10) Patent No.: US 11,550,885 B2
(45) Date of Patent: Jan. 10, 2023

(54) SECURITY ENABLED FALSE DESKTOP COMPUTING ENVIRONMENT

(71) Applicant: Bank of America Corporation, Charlotte, NC (US)

(72) Inventors: Daniel Horne, Charlotte, NC (US); George Albero, Charlotte, NC (US); Robert A. Lang, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 113 days.

(21) Appl. No.: 16/850,186

(22) Filed: Apr. 16, 2020

(65) Prior Publication Data

US 2021/0326416 A1   Oct. 21, 2021

(51) Int. Cl.
*G06F 21/00* (2013.01)
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
CPC ... G06F 21/31; G06F 21/6218; H04L 63/107; H04W 12/12; H04W 12/30; H04W 12/63
See application file for complete search history.

(56) References Cited

U.S. PATENT DOCUMENTS

| 7,373,662 | B2 | 5/2008 | Foster et al. |
| 7,558,564 | B2 | 7/2009 | Wesby |
| 7,908,656 | B1 * | 3/2011 | Mu .................. G06F 21/6218 726/22 |
| 8,457,622 | B2 | 6/2013 | Wesby |
| 2003/0105971 | A1 * | 6/2003 | Angelo ................ G06F 21/57 709/229 |
| 2009/0170532 | A1 * | 7/2009 | Lee .................. H04M 1/72451 455/456.3 |
| 2009/0253408 | A1 | 10/2009 | Fitzgerald et al. |
| 2014/0331285 | A1 * | 11/2014 | Desai ................ H04M 1/72457 726/4 |
| 2018/0288026 | A1 * | 10/2018 | Callaghan ............ H04L 9/3226 |

* cited by examiner

*Primary Examiner* — Joseph P Hirl
*Assistant Examiner* — Chi D Nguy
(74) *Attorney, Agent, or Firm* — Banner & Witcoff, Ltd.

(57) ABSTRACT

A computing system for securely managing access to resources of a computing device receives an input at a secure login of a user interface. The computing system compares the input to a plurality of stored security measures and activates one of an operating system or a configuration of a false desktop system. A user interface of the false desktop system shares characteristics with a user interface of an operating system and restricts access to specified files, data stores, applications, networking functions, and/or ports associated with the computing system. When configured, the false desktop system or the operating system is enabled based on the location of the computing system. When configured, the false desktop system deletes files, data stores, and applications of the operating system.

18 Claims, 6 Drawing Sheets

| Login Name | Security Key | Access Result |
|---|---|---|
| login_1 | password_1 | User Operating System (Normal operation) |
| login_2 | password_2 | False Desktop System (configuration_1) |
| login_1 | password_2 | False Desktop System (configuration_2) |
| login_3 | password_3 | Invalid Input (No Access) |
| login_4 | password_4 | False Desktop System (configuration_3) |

400

| Login Name | Security Key | Access Result |
|---|---|---|
| login_1 | password_1 | User Operating System (Normal operation) |
| login_2 | password_2 | False Desktop System (configuration_1) |
| login_1 | password_2 | False Desktop System (configuration_2) |
| login_3 | password_3 | Invalid Input (No Access) |
| login_4 | password_4 | False Desktop System (configuration_3) |

SECURITY ENABLED FALSE DESKTOP COMPUTING ENVIRONMENT

BACKGROUND

Aspects of the disclosure relate to managing access to resources of a computing device. One or more aspects of the disclosure relate to a desktop management system capable of managing systems that control access to the contents and peripherals of a computing device.

Today, computer use by employees and/or members of organizations (e.g., business organizations, educational institutions, governmental entities, and the like) functions as a part of fundamental enterprise operations. Such users typically utilize these computing devices to perform their duties and manage their responsibilities. In some cases, the computing devices operated by the users may contain private information (personal and/or organizational), leading many users to utilize one or more security measures (passwords, security keys, and the like) to secure access to the computing devices. In some cases, a user may be required to unlock a computing device to display the functionality and the contents of the computing device to an external individual, such as to a customs official at a border crossing. In some cases, to avoid allowing the external individual access to any private information stored on the computing device, the user may intentionally erase the contents of the computing device. However, such extreme measures may require the user to manually input a command to erase the contents of the computing device, without providing an alternative measure to provide restricted access to the external individual of the public or non-private functionality and/or the contents of the computing device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing secure access to resources of a computing device to an external individual.

A computing device may store private and/or non-public information in one or more storage areas and operate proprietary applications and/or systems of the computing device. In some cases, such as during travel to a foreign country, a user may be required to grant access an external individual (e.g., a government agent or official) access to the computing device to allow the external individual to verify the computing device's functionality and/or to examine the computing device's contents. To comply with such requests and to still maintain the security of the private information contained in the computing device, one or more alternative security methods may be applied. In some cases, a computing device may be equipped with a false desktop system capable of providing the appearance and functionality expected of the operating system of the computing device, while also securely managing access to selected functionality, applications, and/or stored information of the computing device. The false desktop system may be activated through user input, such as a login name and security key (e.g., a password) entered through a secure login process.

In some cases, the computing device may include a desktop management system to configure and/or manage one or more configurations of the false desktop system. The desktop management system may be capable of switching between the user operating system and the false desktop system. Switching between system by the desktop management system may involve inputting one or more security measures. For example, at a secure login interface of the computing device, the user may input a standard security key (e.g., a login name and password combination for use in accessing aspects of an enterprise computing network) to allow standard access to the computing device (e.g., the user interface of the operating system) or an alternate security key to activate a configuration of the false desktop system. Additionally or alternatively, the false desktop system may be activated based on the location of the computing device. For example, a global positioning system (GPS) unit associated with the computing device may detect the computing device to be outside the user's defined location (e.g., state, province, country, and the like) and may trigger the desktop management system to enable the false desktop system.

The false desktop may retain the same user interface system as the user operating system of the computing device (e.g., the false desktop system will be visually similar to the user operating system). In some cases, one or more alternate security measures may be input at the secure login interface of the computing device. Each of the one or more alternate security measures may each correspond to different configurations of the false desktop system.

In some cases, the false desktop system may be configured to erase the content of the computing device after an alternate security measure is entered at the secure login of the computing device. In some cases, the false desktop system may be configured to erase the content of the computing device based on one or more consecutive inputs of the alternate security measure and/or security measure of the computing device. For example, the false desktop system may be configured to erase the contents of the computing device after 5 consecutive inputs of an alternate security key. In some cases, the false desktop system may be configured to disable input attempts at the secure login after the input of one or more unknown security measures (e.g., the security key does not correspond to the operating system and/or a configuration of the false desktop system). Additionally or alternatively, in some cases, the false desktop system may be configured to enable a defined configuration of the false desktop system after the input of one or more unknown security measures. The false desktop system may be configured to disable access to at least a portion of internal drives and/or shared network drives communicatively coupled to the computing device. In some cases, the false desktop system may be configured to disable the functionality of ports of the computing device (e.g., a universal serial bus (USB) port, a secure digital (SD) card reader, a high-definition multimedia interface (HDMI) port, and the like). In some cases, the false desktop system may be configured to disable networking components of the computing device (e.g., a wireless network card, an ethernet port, a telecommunications network card). In some cases, the false desktop system may be configured to disable access to storage drives and/or external storage devices.

In some cases, the false desktop system may be configured to delete one or more files, folders, data stores, and/or applications of the computing device. Additionally or alternatively, the false desktop system may be configured to disable access to one or more files, folders, data stores, and/or applications of the computing device. For example, the one or more files, folders, data stores, and/or applications of the computing device may contain potentially private information (e.g., confidential company information, export controlled material, and the like). One or more applications operational in the user operating system of the computing device may be accessible in the false desktop system. In some cases, the applications accessible via the false desktop system may have limited and/or restricted functionality. For example, functionality of a word processing application may be disabled in the false desktop system to disable a user's ability to access and/or modify data of a text file. In some cases, the false desktop system may be configured to function as a read-only version of the user operating system. For example, the false desktop system may have equivalent functionality when compared to the user operating system of the computing device with an exception being that the false desktop system may restrict the ability to use and/or modify certain elements of the user operating system (e.g., programs, files, folders, applications, and the like).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 shows an illustrative decision scenario table where access to data resources is determined for users in accordance with one or more aspects described herein;

DETAILED DESCRIPTION

Figure 1:
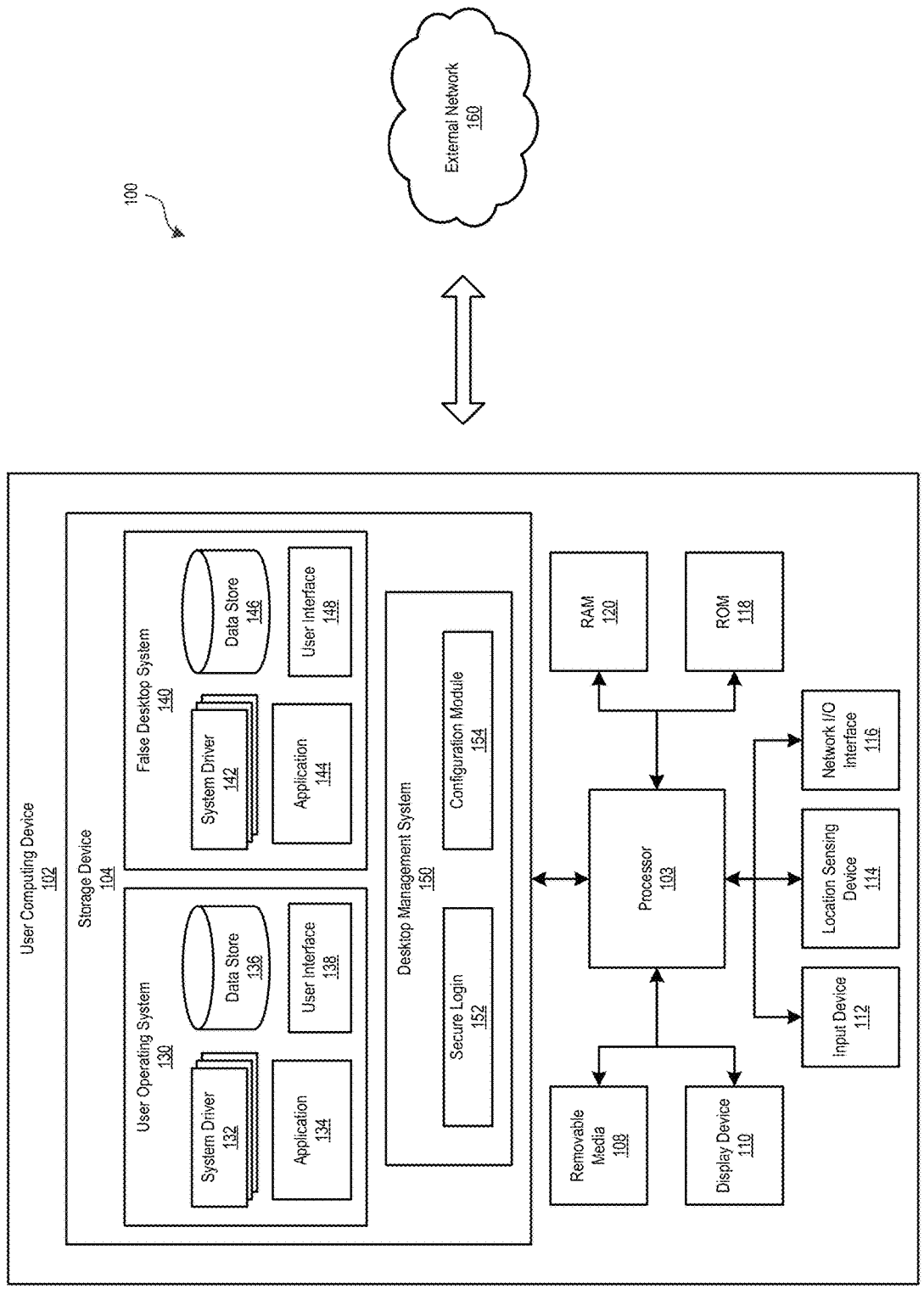
FIG. 1 depicts an illustrative computing environment for managing access to resources of a computing device in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

A need has been identified for an improved and robust system capable of securely managing access to resources of a computing device. Aspects described herein are directed to developing a system for a secure false desktop within a computing device that may be used to verify operability of the computing device to an external individual.

Today, most if not all, enterprise organizations (e.g., a financial institution, a medical provider, a governmental agency, an educational institution, a business organization, and the like) use computing devices to carry out fundamental organizational operations and activities. One or more users (e.g., employees) of enterprise organization associated computing devices may operate these computing devices to perform their duties and manage their responsibilities. In some cases, such users may access, manage, and/or maintain private or otherwise non-public information via these computing devices. To protect private information accessed via the associated computing devices, enterprise organizations enable security measures (passwords, security keys, biometric information, and the like) for to manage access to and/or use of their associated computing devices.

In some cases, such as during travel, a user associated with a computing device may be required to unlock a computing device to display the functionality and the contents of the computing device to an external individual and at a location not associated with the enterprise organization. For example, while on travel in a foreign country, the user may be asked by a travel officer to unlock a laptop computing device to allow the travel officer to verify the laptop computing device is operable. To avoid allowing access to private or nonpublic information (e.g., export controlled information, company trade secrets, proprietary information, and the like) stored on the computing device, the user may attempt to intentionally erase private information accessed via the computing device. However, such an attempt to erase information on the computing device may cause the user to be susceptible to seizure of their computing device and/or left without access to necessary private or non-public information. As such, a need has been recognized for an improved system that may allow a user of a computing device to provide an external individual access to the computing device, without exposing potentially private information.

In some cases, a user may secure a computing device (e.g., a cell phone, a laptop computer, a tablet, and the like) by defining and/or enabling one or more security measures (e.g., a password, a security key, a login name) to control access to selected features, applications, and/or data stored on the computing device. For example, each of the one or more security measures may be associated with a different secure configuration of the computing device. Inputting the one or more security measures at a secure login interface of the computing device may grant access, based on the different configured security levels, to the computing device and the associated user interface. In some cases, the user may define and/or enable one or more alternate security measures. Inputting the one or more alternate security measures at the secure login of the computing device may grant access to a false desktop system via a desktop management system. The false desktop system may be a system capable of reflecting the appearance and functionality of the user operating system of the computing device, while securely managing access to select features of the computing device. For example, after a user enters one or more of the alternate security measures at the secure login, the desktop management system may enable the false desktop system, where the false desktop system resembles the user interface of the user operating system of the computing device. At a display coupled to the computing device, the user interface of the false desktop system may be at least similar to the user interface of the user operating system.

In some cases, the desktop management system may automatically enable the false desktop system. The desktop management system may be configured to enable the false desktop system based on the location of the computing device. The computing device may contain one or more software and/or hardware devices capable of determining the location of the computing device. For example, a location sensing device (e.g., a global positioning system (GPS) unit, a location sensor operational on a telecommunications network, and the like) associated with the computing device may determine whether the computing device is outside a configured location (e.g., state, province, country, and the like) and may trigger the desktop management system to enable the false desktop system upon login. In some cases, while the computing device is outside a configured location, the desktop management system may enable the false desktop system after input of security measures associated with the user operating system. To enable the user operating system while the computing device is outside a configured location, the desktop management system may require one or more additional inputs of security measures associated with the user operating system.

In some cases, the false desktop system may have one or more configurations. The one or more configurations of the false desktop system may be modular, where functionality of the false desktop system may be disabled, enabled, modified, and/or altered. The one or more configurations may be configured by the user of the computing device and/or the enterprise organization associated with the computing device. The one or more configurations may be configured at a configuration module of the desktop management system. The one or more configurations of the false desktop system may be enabled through input of one or more alternate security measures. The one or more alternate security measures may be input at the secure login of the desktop management system. For example, a user may enter an alternate password at the secure login of the desktop management system, which may cause the desktop management system to boot the computing device to a configuration of the false desktop system.

In some cases, the one or more alternate security measures associated with the one or more configuration of the false desktop system may be enabled for a certain period of time and/or may expire after a defined period of time. For example, the alternate security measures may be enabled for a period of 3 days while a user is traveling with a computing device. After the 3-day time period expires, inputting the one or more alternate security measures at the secure login of the computing device may have no response. In some cases, the false desktop system may be enabled as the default mode of the computing device. For example, the computing device may boot to the false desktop system by default and require the input of a password of the user operating system to exit the false desktop system and enable the user operating system.

In some cases, the false desktop system may be configured to disable access to one or more ports of the computing device. For example, the false desktop system may be configured to disable the USB ports of the computing device. In some cases, the false desktop system may disable access to one or more storage devices of the computing device. User access to one or more partitions of the one or more storage drives may be disabled, while access to one or more alternate partitions of the one or more storage drives may be allowed. Access to one or more removable media drives may be disabled in the false desktop system. For example, access to an external hard drive and a CD (compact disk) drive coupled to the computing device may be disabled. In some cases, networking components of the computing device may be disabled within the false desktop system. For example, ethernet ports and networking cards of the computing device may be disabled, which may prevent the computing device from connecting to an outside network via ethernet and/or Wi-Fi connections. Within the false desktop system, access to one or more applications may be disabled and/or restricted. For example, access to a proprietary business application may be disabled, while access to a spreadsheet application may be restricted to read-only access.

Additionally or alternatively, the false desktop system may be configured to generate false data for access in the false desktop system. The false data may be generated based on the information associated with the user (e.g., name, email address, employment position, and the like). For example, to allow an external individual to verify operability of the computing device (e.g. a customs agent at a border crossing), one or more false email messages addressed to and/or sent from the user that contain language associated with the user may be generated and made accessible in an email client platform of the false desktop system. The user may configure the information associated with the user at the configuration module. In some cases, the desktop management system may be configured to delete one or more elements stored within the computing device after input of one or more alternate security measures. For example, after input of an alternate security measure at the secure login of the computing device, the desktop management system may grant access to the corresponding configuration of the false desktop system, while the desktop management system deletes confidential business information from a data store of the computing device. Additionally or alternatively, for example, after input of a different alternate security measure at the secure login of the computing device, the desktop management system may grant access to a configuration of the false desktop system, while the desktop management system deletes a specific folder containing private information associated with the user.

In some cases, the elements deleted from storage locations within the computing device after input of an alternate security measure may be preconfigured in the desktop management system. For example, a user may configure the desktop management system to delete a specific partition of a hard drive of the computing device after the alternate security measure associated with each operation is entered. In some cases, the one or more alternate security measures may be input consecutively to perform the operations associated with each alternate security measure. For example, a user who wishes to delete a specific folder and delete access to specific shared drive of the computing device may consecutively input the alternate security measures that correspond with each operation.

FIG. 1 depicts an illustrative computing environment 100 for managing access to resources of a computing device in accordance with one or more aspects described herein. The illustrative computing environment 100 may include a user computing device 102. The user computing device 102 may be one of a mobile device, a tablet, a laptop computer, a desktop computer and/or the like. The user computing device 102 may be communicatively coupled to one or more external networks 160 (e.g., a telecommunications network, the Internet, a Wi-Fi network, and the like). In some cases, the external network 160 may be a wired or wireless network, such as the networks described below with respect to FIGS. 4 and 5. The user computing device 102 may comprise one or more processors 103, which may execute computer-readable instructions to perform any of the functions described herein. Computer-readable instructions may be stored in one or more of a storage device 104, a read-only memory (ROM) 118, a random access memory (RAM) 120, a removable media 108 (e.g., a USB drive, a CD, a digital versatile disk (DVD)), and/or another type of computer-readable medium or memory.

In some cases, the user computing device 102 may comprise one or more output devices, such as a display device 110 (e.g., an external or internal display device). The user computing device 102 may include one or more input devices 112. The one or more input devices 112 may include a remote control, a keyboard, a mouse, a track pad, a touch screen (which may be integrated with the display device 110), a microphone, and the like. The user computing device 102 may also comprise one or more network interfaces, such as a network input/output (I/O) interface 116 (e.g., a network card) to communicate with the external network 160. The network I/O interface 116 may be a wired interface (e.g., electrical, radio frequency (RF), optical), a wireless interface (e.g., Wi-Fi), and/or a combination of a wired and a wireless interface. The network I/O interface 116 may comprise a modem configured to communicate with the external network 160. The user computing device 102 may optionally include one or more devices capable of sensing the location of the user computing device 102, such as a location sensing device 114 (e.g., a GPS microprocessor). The location sensing device 114 may be configured to receive and process global positioning signals and determine, with possible assistance from the external network 160, a geographic position of the user computing device 102. The location of the user computing device 102 may be obtained through triangulation via the external network 160 and/or via a separate location sensing device in communication with and/or associated with the user computing device 102 (e.g., location information received from a phone or other mobile device).

In some cases, the one or more storage devices 104 may be internally or externally coupled to the user computing device 102. The one or more storage devices 104 may include one or more of a hard disk drive, a solid-state drive (SSD), and/or any other type of computer-readable medium or memory. The one or more storage devices 104 may have one or more partitions (e.g., one or more storage locations within a storage device 104). In some cases, the one or more storage devices 104 may contain a user operating system 130. One or more user operating systems 130 may exist in the one or more storage devices 104. For example, a user computing device 102 may contain a storage device 104 (e.g., an SSD) that contains two user operating systems (e.g., 130). The user operating system 130 may include a user interface 138. The user interface 138 may be displayed at display device 110. The user interface 138 may take input from the one or more input devices 112. For example, a user interface 138 of the user operating system 130 may receive inputs from a mouse and a keyboard communicatively coupled to the user computing device 102.

In some cases, the user operating system 130 may contain one or more system drivers 132. The one or more system drivers 132 may include one or more files and/or groups of files that enable one or more elements of the user computing device 102 to interface and/or communicate with the user operating system 130. For example, there may exist a system driver 132 that enables an input device 112 (e.g., a keyboard, a mouse, a trackpad, a touchscreen, and the like) to interface with the user computing device 102 and the user operating system 130. Additionally or alternatively, for example, there may exist a system driver 132 that enables a removeable media 108 (e.g., a USB drive) to interface with the user computing device 102 and the user operating system 130 via a port of the user computing device 102.

In some cases, the user operating system 130 may contain one or more applications 134. The one or more applications 134 may include email client platforms, internet browsers, business productivity applications (e.g., a word processing application, a spreadsheet application, a presentation application, a file management system application and the like), proprietary enterprise applications, and the like. The one or more applications 134 may be capable of having modified and/or restricted functionality. For example, an email client platform may have restricted functionality, which may restrict an individual from accessing the email client platform at the user operating system 130 of the user computing device 102. The one or more applications 134 may not be modifiable by an individual operating the user computing device 102. For example, a proprietary business application may not be able to be deleted, moved, and/or copied from its location on the one or more storage devices 104. The location of the one or more applications 134 within the one or more storage devices 104 may be concealed and/or hidden. For example, a spreadsheet application stored within the one or more storage devices 104 of the user computing device 102 may be hidden from view via a file system browsing at the storage location of the spreadsheet application. Hiding the presence of the spreadsheet application may prevent the spreadsheet application from being accessible and/or searchable within a file directory system of the user operating system 130.

In some cases, the user operating system 130 may include one or more data stores 136. The one or more data stores 136 may be contained locally within the one or more storage devices 104 of the user computing device 102. Additionally or alternatively, the one or more data stores 136 may be located at a networked destination (e.g., shared network drives) accessible via the external network 160. The one or more data stores 136 may contain one or more files, folders, databases, applications 134, programs, and the like. The one or more data stores 136 may not be modifiable by an individual operating the user computing device 102. For example, a specific folder may not be able to be deleted, moved, and/or copied from its location on the one or more storage devices 104. The storage location of the one or more data stores 136 and/or contents of the one or more data stores 136 may be concealed and/or hidden. If the one or more data stores 136 are concealed and/or hidden, the one or more data stores 136 and their contents may not be accessible and/or searchable within the user operating system 130. For example, a text file stored within the one or more storage devices 104 of the user computing device 102 may be hidden. Hiding the presence of the text file may prevent the text file from being accessible and/or searchable within a file directory system of the user operating system 130. Access to the one or more data stores 136 and/or contents of the one or more data stores 136 may be disabled. For example, access to a shared network drive accessible via external network 160 may be disabled.

In some cases, the one or more storage devices 104 may contain a false desktop system 140. The false desktop system 140 may be stored on a separate partition and/or storage device 104 than the user operating system 130. Additionally or alternatively, the false desktop system 140 may be stored on the same partition and/or storage device 104 as the user operating system 130. In some cases, the false desktop system 140 may be capable of operating using one or more configurations to enable/disable selected applications (e.g., 134, 144), system drivers (e.g., 132, 142), and/or devices, enable/disable access to information stored one or more storage devices (e.g., 104), and/or to selectively delete, hide or obfuscate information and/or applications (e.g., 134, 144). The false desktop system 140 may be a copy and/or image of the user operating system 130. Additionally or alternatively, the false desktop system 140 may be combined with the user operating system 130. In some cases, the false desktop system 140 may include a user interface 148. The user interface 148 may be displayed at the display device 110. The user interface 148 may take input from the one or more input devices 112. For example, a user interface 148 of the false desktop system 140 may take inputs from a mouse and a keyboard communicatively coupled to the user computing device 102. The user interface 148 of the false desktop system 140 may be at least visually similar to the user interface 138 of the user operating system 130. For example, the user interface 148 of the false desktop system 140 may visually resemble the user interface 138 of the user operating system 130, which may prevent an individual operating the user computing device 102 from determining whether they are accessing the user operating system 130 or the false desktop system 140. The false desktop system 140 may be read-only. For example, the false desktop system 140 and user interface 148 may be accessible to an individual operating the user computing device 102 and the individual may not be capable of modifying any element of the false desktop system 140.

In some cases, the false desktop system 140 may contain one or more system drivers 142. The one or more system drivers 142 may include one or more files and/or groups of files that enable one or more elements of the user computing device 102 to interface and/or communicate with components of the false desktop system 140. The one or more system drivers 142 may be equivalent to the one or more system drivers 132 of the user operating system 130. For example, there may exist a system driver 142 that enables an input device 112 (e.g., a keyboard, a mouse, a trackpad, a touchscreen, and the like) to interface with the user computing device 102 and the false desktop system 140. Additionally or alternatively, for example, there may exist a system driver 142 that enables a removeable media 108 (e.g., a USB drive) to interface with the user computing device 102 and the false desktop system 140. Additionally or alternatively, the false desktop system 140 may contain one or more system drivers 142 that are different from the one or more system drivers 132 of the user operating system 130. In some cases, the one or more system drivers 142 may allow for restrictions to peripherals of the false desktop system 140 that are not reflected in the user operating system 130.

In some cases, the one or more storage devices 104 may contain one or more applications 144. The one or more applications 144 may include email client platforms, internet browsers, business productivity applications, proprietary enterprise applications, and the like. The one or more applications 144 may be equivalent to the one or more applications 134 of the user operating system 130. The one or more applications 144 may have equivalent features, functions, and/or operations as described for the one or more applications 134. In some cases, the one or more applications 144 may have their features, functions, and/or operations modified and/or restricted in comparison to the one or more applications 134. For example, a presentation application may be fully operational in the user operating system 130, while the same presentation application may have read-only functionality in the false desktop system 140. In some cases, the one or more applications 144 may be stored at the same storage locations and/or partitions as the one or more applications 134. For example, an individual accessing the false desktop system 140 may operate and access an email client platform in the false desktop system 140, where the email client platform is the same email client platform as that accessed in the user operating system 130, with the same storage location in the one or more storage devices 104. Additionally or alternatively, the one or more applications 144 may be stored at separate storage locations and/or partitions as the one or more applications 134 and may include applications different from the one or more applications 134.

In some cases, the false desktop system 140 may contain one or more data stores 146. The one or more data stores 146 may be equivalent to the one or more data stores 136. For example, a data store 146 accessed in the false desktop system 140 may be the same data store with the same storage location as a data store 136 in the user operating system 130. Additionally or alternatively, the one or more data stores 146 may be separate and/or stored at different storage locations compared to the one or more data stores 136. In some cases, the one or more data stores 146 may have features and functions equivalent to those described for the one or more data stores 136. The one or more data stores 146 may be contained locally within the one or more storage devices 104 of the user computing device 102. Additionally or alternatively, the one or more data stores 146 may be located at a networked destination (e.g., shared network drives) accessible via the false desktop system 140. The one or more data stores 146 may contain one or more files, folders, databases, applications 134, and the like that are equivalent to those stored in the one or more data stores 136. In some cases, the one or more data stores 146 may have features and functions that are modified and/or restricted in comparison to the one or more data stores 136. For example, a folder in the user operating system 130 may be fully accessible and modifiable by an individual operating the user computing device 102, whereas a similar folder in the false desktop system 140 that has similar contents (e.g., the folder contains the same files, programs, applications, and the like) to the folder in the user operating system 130 may not be accessible, may contain less data, and/or may contain false data.

In some cases, the one or more storage devices 104 may include a desktop management system 150. In some cases, only one of the user operating system 130 and the false desktop system 140 may be active and accessible at the user computing device 102. The desktop management system 150 may manage switching between the user operating system 130 and the false desktop system 140. Switching between the user operating system 130 and the false desktop system 140 may utilize a secure login 152 of the desktop management system 150. The secure login 152 may be displayed at display device 110 of the user computing device 102. An individual may input one or more security measures (e.g., a password, a security key, a login name) at a secure login 152 of the desktop management system 150. The one or more security measures may be input using the one or more input devices 112 (e.g., a keyboard, a mouse) of the user computing device 102. The one or more security measures may correspond to enabling and/or disabling the user operating system 130 and/or the false desktop system 140. In some cases, the one or more security measures may be a login name, a password, and/or combination of a login name and a password. A specific login name may be associated with one or more passwords and/or one or more configurations of the false desktop system 140, with each password corresponding to a configuration of the false desktop system 140. For example, an individual may enter a password at the secure login 152 that grants access to the user operating system 130. At the user operating system 130, the individual may access the secure login 152 and input an alternate login and password pair that disables the user operating system 130 and enables the false desktop system 140 at the user computing device 102. Additionally or alternatively, for example, the individual may enter an alternate password at the secure login 152 to enable and access the false desktop system 140. The secure login 152 may act as a gateway to the user operating system 130 and/or the false desktop system 140.

In some cases, the input of the one or more security measures at the secure login 152 may cause the desktop management system 150 to enable one or more features and/or configurations of the false desktop system 140. For example, entering a first password at the secure login 152 may enable a false desktop system 140 with restricted access to the one or more applications 144 (e.g., a first configuration). Additionally or alternatively, for example, entering a second password at the secure login 152 may enable a false desktop system 140 with restricted access to the one or more applications 144 and disabled removable media 108 (e.g., a second configuration). In some cases, after input of one or more incorrect security measures at the secure login 152 (e.g., the entered password does not correspond to enabling the user operating system 130 and/or the false desktop system 140), the desktop management system 150 may enable a defined configuration of the false desktop system 140. For example, after an individual enters a password at the secure login 152 that does not correspond to the user operating system 130 and/or the false desktop system 140, the desktop management system 150 may grant access to a configuration to the false desktop system 140 to prevent further password attempts by the individual. Additionally or alternatively, in some cases, after input of one or more incorrect security measures at the secure login 152, the desktop management system 150 may disable access to and/or security measure input attempts at the secure login 152 indefinitely and/or for a time period.

In some cases, the user operating system 130 may be the default mode of the user computing device 102. The default mode of the user computing device 102 may be the system (e.g., user operating system 130, false desktop system 140) that is booted and/or loaded from the one or more storage devices 104 by the desktop management system 150 when the user computing device 102 is accessed (e.g., powered on, woken from sleep, unlocked, and the like). The user operating system 130 and/or the false desktop system 140 may be active (e.g., loaded from the one or more storage devices 104) and ready to be enabled by the desktop management system 150, without the need to be booted and/or loaded from the one or more storage devices 104. In some cases, a user may configure the desktop management system 150 to enable the false desktop system 140 as the default mode of the user computing device 102. The default mode of the user computing device may be configured using the secure login 152 and/or a configuration module 154 of the desktop management system 150.

In some cases, the desktop management system 150 may include a configuration module 154 to configure the one or more configurations of the false desktop system 140. The configuration module 154 may be displayed at the display device 110 and/or take one or more inputs from the one or more input devices 112 (e.g., a mouse, a keyboard). The configuration module 154 may allow a user to enable and/or disable the features, functions, and/or peripherals of the user operating system 130 and/or the false desktop system 140 described herein. For example, a user accessing the configuration module 154 of the desktop management system 150 may be able to configure a false desktop system 140 the restricts, hides, and/or deletes selected files, folders, applications 144, and/or data stores 146. At the configuration module 154, the user may configure one or more security measures for association with the one or more configurations of the false desktop system 140. For example, a user may define a first password for a first configuration of the false desktop system 140 and define a second password for a second configuration of the false desktop system 140. In some cases, a user may configure the desktop management system 150 to enable one or more configurations of the false desktop system 140 based on successive input of the one or more security measures within a certain time period. For example, if a user enters a first login name and password at the secure login 152 of the desktop management system 150 twice within a 30 second period, a specific configuration of the false desktop system 140 may be enabled, where the configuration may different from a configuration enabled by entering first password once. In some cases, the one or more security measures corresponding to one or more configurations of the false desktop system 140 may be time-sensitive and may expire after a certain period of time. For example, a password may be configured to enable a configuration of the false desktop system 140 for 7 days. If the password is entered at the secure login 152 within the 7-day interval, the corresponding configuration of the false desktop system 140 may be enabled. If the password is entered at the secure login 152 after the 7-day interval expires, the secure login 152 may register an incorrect password attempt, as the password will have expired and would not correspond to an active configuration of the false desktop system 140.

In some cases, at the configuration module 154, the user may configure the desktop management system 150 to disable one or more ports associated with the one or more removable media 108, input devices 112, and/or network I/O interface 116 of the user computing device 102. The one or more ports may be disabled by configuring the associated system drivers (e.g., 132, 142). For example, the user may configure the desktop management system 150 to disable the network I/O interface 116 in a configuration of the false desktop system 140. Additionally, or alternatively, for example, the user may configure the desktop management system 150 to disable the ports for one or more removable media 108, disabling the use of external storage devices that are communicatively coupled to the user computing device 102 by a USB connection. At the configuration module 154, the user may configure the desktop management system 150 to delete the contents of the one or more storage devices 104 based on the input of one or more security measures at the secure login 152. For example, entering a password at the secure login 152 may trigger the desktop management system 150 to delete the contents of the one or more data stores 136 and 146. In some cases, at the configuration module 154, the user may enable and/or disable location-based functionality associated with the user operating system 130 and/or false desktop system 140. For example, the desktop management system 150 may disable the location sensing device 114 and/or any other location tracking element of the user computing device 102. The location sensing device 114 and/or other location tracking element of the user computing device 102 may be disabled by configuring the associated system drivers (e.g., 132, 142).

In some cases, the desktop management system 150 may enable the user operating system 130 or the false desktop system 140 as the default mode based on the location of the user computing device 102. The desktop management system 150 may monitor the location of the user computing device 102 based on location information from the location sensing device 114 and/or via the external network 160. In some cases, the desktop management system 150 may be configured to enable and/or disable the false desktop system 140 based on the location of the user computing device 102. For example, if the user associated with the user computing device 102 is based in a country (e.g., the United States), the desktop management system 150 may be configured to enable the false desktop system 140 if the user computing device 102 exits the United States. As such, the false desktop system 140 may be disabled by the desktop management system 150 if the user computing device 102 reenters the United States. Additionally or alternatively, for example, the desktop management system 150 may be configured to enable and/or disable the false desktop system 140 when the user computing device 102 enters and/or exit a configured location (e.g., a city, a state, a province, a country and/or a portion of same) and/or area around a configured location. For example, a country may be defined to be hostile in the configuration module 154. As such, the desktop management system 150 may be configured to enable the false desktop system 140 as the default mode of the user computing device 102 when the user computing device 102 enters a defined radius around certain geographical coordinates of the country defined to be hostile. Additionally or alternatively, for example, a configuration of the false desktop system 140 may be enabled when the user computing device 102 exits the perimeter of a defined location (e.g., an office building associated with the enterprise organization associated with the user) and disabled when the user computing device 102 enters the perimeter of the defined location.

The desktop management system 150 may enable and/or disable one or more features of the user operating system 130 and the false desktop system 140. The one or more features may be enabled and/or disabled based on the input of one or more security measures. For example, the desktop management system 150 may modify a system driver 142 to disable the network I/O interface 116 in the false desktop system 140. This may prevent an individual operating the user computing device 102 in the false desktop system 140 from connecting the user computing device 102 to one or more external networks 160 via a wired and/or a wireless connection. Additionally or alternatively, for example, the desktop management system 150 may disable an application 144 of the false desktop system 140. In some cases, the input of the one or more security measures at the secure login 152 may cause the desktop management system 150 to delete one or more elements of the user operating system 130 and/or the false desktop system 140. For example, entering a password at the secure login 152 may trigger the desktop management system 150 to enable the false desktop system 140 and delete a data store 136 containing private information from the user operating system 130. If a data store 146 containing content corresponding to the data store 136 exists in the false desktop system 140, the desktop management system 150 may delete the data store 146, ensuring that the private information of the corresponding deleted data store 136 is not available for access in the data store 146.

In some cases, the desktop management system 150 may generate false data. The false data may be generated based on one or more template false data files (e.g., email messages, documents, spreadsheets, and the like) stored in the desktop management system 150. The template false data files may be files with predetermined locations in the data files to insert user information, where the files may appear as actual data in one or more applications 144. The false data may be accessible in the false desktop system 140. The false data may include one or more files and/or folders. The false data may be generated to include information associated with the user (e.g., a name, an email address, an employment title) of the user computing device 102. In some cases, the false data may be stored in a location of the one or more storage devices 104 that is associated with the one or more applications 144. Access to the false data may be enabled within the false desktop system 140, while access to other types of data is disabled. For example, the desktop management system 150 may generate a false email message based on the user's name and email address, using a template false email message of the desktop management system 150. The false email message may be accessible in an email client platform (e.g., application 144) of the false desktop system 140, where access to email messages is otherwise disabled. The false email message may allow an external individual to verify functionality of an email client platform (e.g., application 144) of the false desktop system 140, without exposing private email information contained in the email client platform. Additionally or alternatively, for example, the desktop management system 150 may generate a false spreadsheet file with information associated with the user, where the false spreadsheet file is generated based on a predetermined false spreadsheet file (e.g., the file contains predetermined data) from the desktop management system 150. The false spreadsheet file may be accessible in a spreadsheet application (e.g., application 144) of the false desktop system 140.

The functionality of the user operating system 130, the false desktop system 140, the desktop management system 150, and user computing device 102 described herein may be altered and/or combined in any way without departing from the present disclosure.

Figure 2:
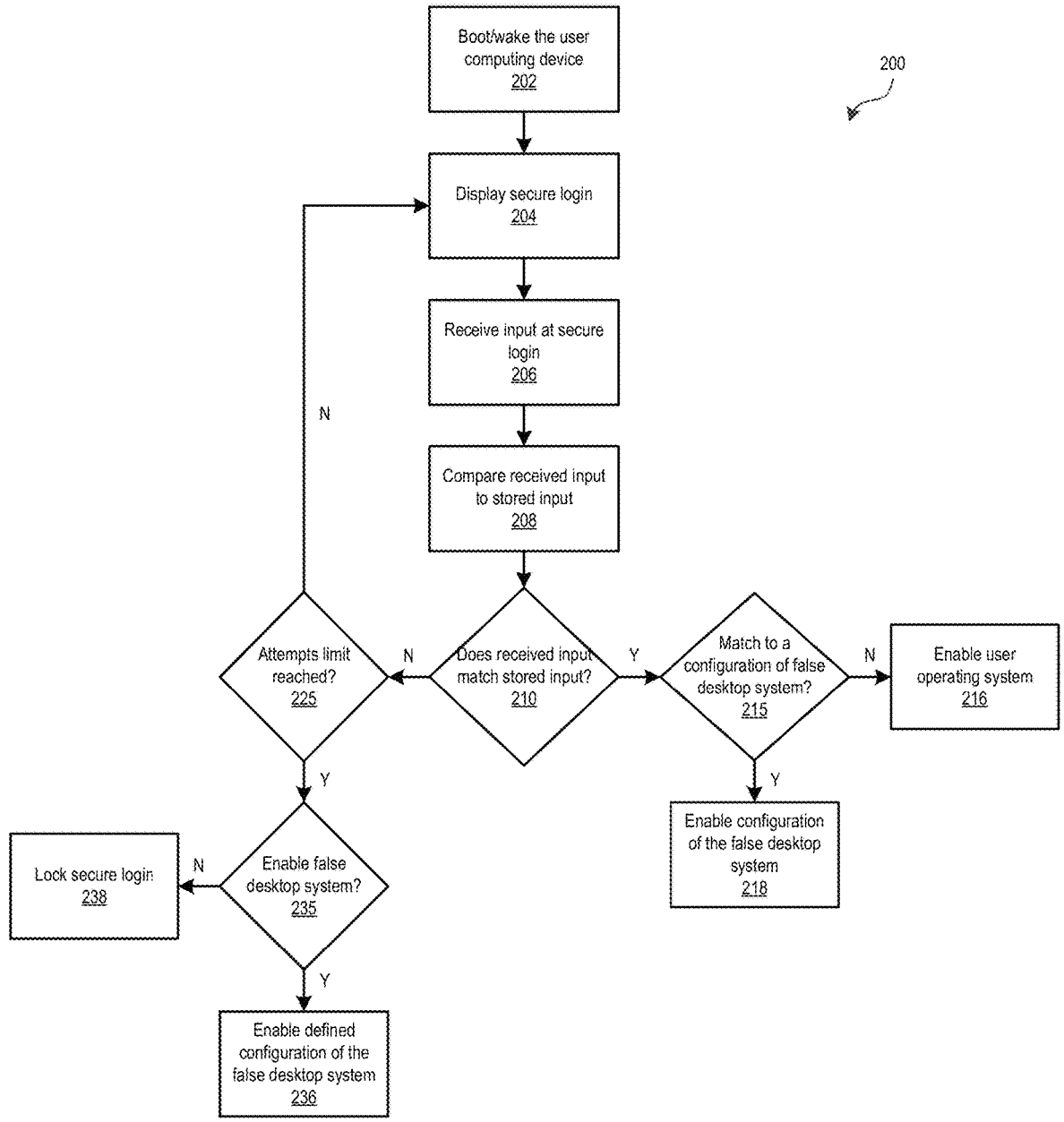
FIG. 2 depicts an illustrative event sequence for enabling a false desktop system according to aspects of this disclosure.

FIG. 2 depicts an illustrative event sequence 200 for enabling a false desktop system 140 according to aspects of this disclosure. The events shown in the illustrative event sequence 200 are illustrative and additional events may be added, or events may be omitted, without departing from the scope of the disclosure. At 202, an individual may boot and/or wake the user computing device 102. This may include powering on the user computing device 102, waking the user computing device 102 from a "sleep" mode, and/or otherwise starting up the user computing device 102. After the user computing device 102 is active at 202, the desktop management system 150 may display the secure login 152 at the display device 110 of the user computing device 102 at 204. At 206, the secure login 152 may receive one or more inputs. The one or more inputs may originate from one or more input devices 112 of user computing device 102. For example, an individual may enter one or more keystrokes at a keyboard (e.g., an input device 112) communicatively coupled to the user computing device 102. At 208, the received input may be compared to stored inputs contained in the desktop management system 150. The comparison may be made by the desktop management system 150. The stored input may be one or more security measures (e.g., login names, passwords) that correspond to one or more configurations of the false desktop system 140 and/or the user operating system 130.

At 210, the desktop management system 150 may determine if the received input corresponds to one or more of the stored inputs of the desktop management system 150. If the received input does match one or more stored inputs at 210, the desktop management system 150 may determine if the matching stored input corresponds to a configuration of the false desktop system 140 at 215. If the matching stored input does not correspond to a configuration of the false desktop system 140 at 215, the desktop management system 150 may enable and/or activate the user operating system 130 at 216. The user interface 138 of the user operating system 130 may be displayed at the display device 110 of the user computing device 102 after enablement/activation. If the matching stored input corresponds to a configuration of the false desktop system 140 at 215, the desktop management system 150 may enable and/or activate the corresponding configuration of the false desktop system 140 at 218. The user interface 148 of the corresponding configuration of the false desktop system 140 may be displayed at the display device 110 of the user computing device 102 after enablement/activation.

If the received input does not match one or more stored inputs at 210, the desktop management system 150 may determine if a configured input attempts limit is reached at the secure login 152 at 225. If the configured input attempts limit is not reached at the secure login 152 at 225, the desktop management system 150 may display the secure login 152 at the display device 110 of the user computing device 102 at 204. If the configured input attempts limit is reached at the secure login 152 at 225, the desktop management system 150 may determine whether to enable a defined configuration of the false desktop system 140 at 235. The desktop management system 150 may be configured to enable a configuration of the false desktop system 140 or disable/lock the secure login 152. If the desktop management system 150 is configured to enable a configuration of the false desktop system 140 at 235, the desktop management system 150 may enable the defined configuration of the false desktop system 140 at 236. The desktop management system 150 may be configured to enable the false desktop system 140 after the attempts limit is reached at the secure login 152 to prevent further input attempts by an individual operating the user computing device 102. If the desktop management system 150 is not configured to enable a configuration of the false desktop system 140 at 235, the desktop management system 150 may lock and/or disable the secure login 152 at 238. Locking and/or disabling the secure login 152 may prevent one or more inputs attempts at the secure login 152. The secure login 152 may remain locked and/or disabled at 238 for a defined period of time and/or indefinitely until a system administrator intervenes to unlock and/or enable the secure login 152.

Figure 3:
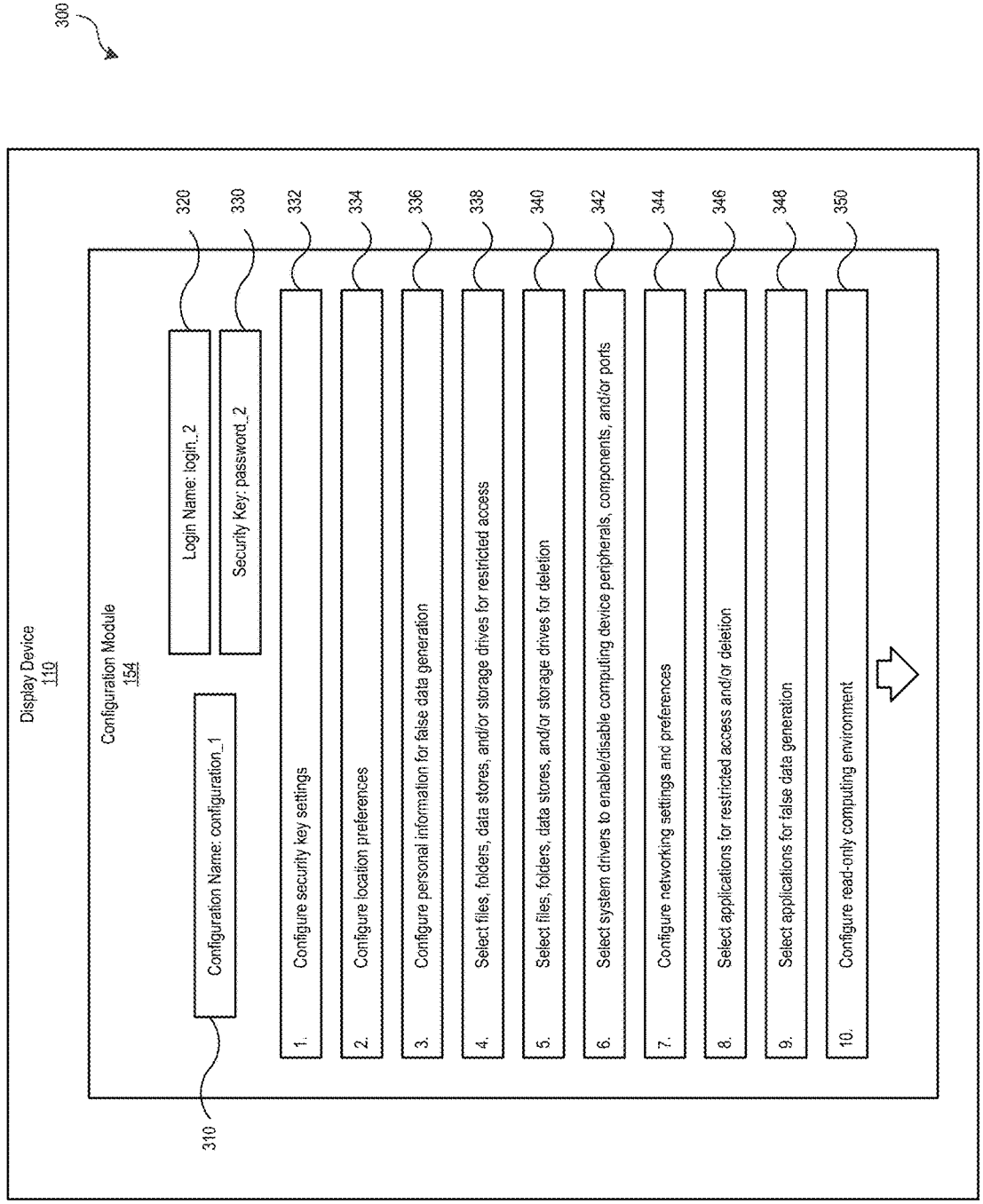
FIG. 3 depicts an illustrative computing interface for configuring a false desktop system according to aspects of this disclosure.

FIG. 3 depicts an illustrative example computing interface 300 for configuring a false desktop system 140 according to aspects of this disclosure. The illustrative example computing interface 300 may include a display device 110 coupled to the user computing device 102. Displayed at the display device 110 may be the configuration module 154 for configuring one or more configurations of the false desktop system 140. The configuration module 154 may include one or more selectable and/or modifiable elements. The configuration module 154 may receive input from one or more input devices 112. Element 310 may display and/or allow the user to configure the name of the configuration of the false desktop system 140 that is currently being configured within the configuration module 154. Element 320 may display and/or allow the user to configure the login name associated with the configuration of the false desktop system. Element 330 may display and/or allow the user to configure the security key associated with the configuration and login name of the false desktop system 140 that is currently being configured within the configuration module 154. The security key may be modified within the configuration module 154 by a user operating the user computing device 102.

Element 332 may allow a user to configure the settings and/or preferences associated with the security key for a configuration of the false desktop system 140. A user may configure an attempt limit at the secure login 152 and configure the result of reaching the attempt limit at 332. In some cases, the user may configure the desktop management system 150 to enable a configuration of the false desktop system 140 and/or to disable further login attempts at the secure login 152. For example, a user may configure the secure login 152 to allow 5 unsuccessful login attempts. After 3 unsuccessful login attempts (e.g. the entered login name and/or security key fails to correspond to the user operating system 130 and/or a configuration of the false desktop system 140), the user may have configured the desktop management system 150 to disable further attempts at the secure login 152. In some cases, at element 332, a user may configure the desktop management system 150 to require one or more successive inputs of the security key to enable a configuration of the false desktop system 140. For example, a user may configure the desktop management system 150 to require 3 successive inputs of the security key "password_2" with the login name "login_2" to enable "configuration_1" of the false desktop system 140, where the 3 successive inputs are received at the secure login 152 within a configured period of time. In some cases, at 332, a user may configure an expiration date for the login name, security key, and/or configuration of the false desktop system 140. For example, a user may configure the security key for "configuration_1" to be "login_2" with "password_2". The user may configure "password_2" to expire 3 days from the date of configuration. After the 3 days, the security key "password_2" will fail to enable "configuration_1" using "login_2" of the false desktop system 140, unless the user reconfigures the expiration date at 332 within the configuration module 154.

Element 334 may allow the user to define location-based functionality for the configuration of the false desktop system 140. For example, the user may configure the configuration "configuration_1" to be the default mode of the user computing device 102 while the user computing device 102 is in a certain location. Additionally or alternatively, the user may configure "configuration_1" to only be accessible via the secure login 152 while located outside of defined location. Element 336 may allow a user to configure personal information associated with the user. The personal information input by the user at the configuration module 154 may be used in the generation of false data. For example, a user may provide their name and email address at element 336. The name and email address may be used by the desktop management system 150 to generate a false email message for access in "configuration_1" of the false desktop system 140. Element 338 may allow a user to configure the desktop management system 150 to restrict access to one or more selected files, folders, data stores, and/or storage devices of the user computing device 102 in a configuration of the false desktop system 140. A user may be able to restrict access and/or hide the storage location of the one or more selected files, folders, data stores, and/or storage devices. For example, a user may select a document file as having restricted access in "configuration_1" of the false desktop system 140, which may prevent an individual from accessing and/or opening the document file. Additionally or alternatively, for example, a user may select a data store to be hidden at element 338, which may prevent an individual from accessing, locating, and/or searching for the data store within a file directory system in "configuration_1" of the false desktop system 140. Element 340 may allow a user to configure the desktop management system 150 to delete one or more selected files, folders, data stores, and/or storage devices of the user computing device 102 in a configuration of the false desktop system 140. For example, a user may select a specific partition of storage device 104 for deletion in "configuration_1" of the false desktop system 140.

Element 342 may allow a user to configure the desktop management system 150 to enable and/or disable one or more system drivers (e.g., 132, 142) for peripherals, components, and ports of the user computing device 102 in a configuration of the false desktop system 140. For example, a user may configure the desktop management system 150 to disable system driver (e.g., 142) for the USB ports of the user computing device 102 in "configuration_1". Additionally or alternatively, for example, the user may configure desktop management system 150 to disable the system driver (e.g., 142) for the location sensing device 114 in "configuration_1". Element 344 may allow a user to configure the network settings and preferences in a configuration of the false desktop system 140. The network settings and preferences may be configured by modifying one or more system drivers (e.g., 132, 142) associated with the network I/O interface 116. For example, element 344 may allow a user to disable the network I/O interface 116 in "configuration_1", preventing an external network 160 from connecting to the user computing device 102 via a wireless (e.g., Wi-Fi) and/or wired (e.g., ethernet) connection.

Element 346 may allow a user to configure the desktop management system 150 to restrict access and/or delete one or more applications of the user computing device 102 in a configuration of the false desktop system 140. A user may be able to restrict access to and/or delete one or more selected applications (e.g., 134, 144). For example, a user may select a proprietary business application (e.g., 144) to have restricted access in "configuration_1" of the false desktop system 140, which may prevent an individual from accessing and/or opening the proprietary business application (e.g., 144). Additionally or alternatively, for example, a user may select proprietary business application (e.g., 144) for deletion in "configuration_1". Element 348 may allow a user to select one or more applications (e.g., 134, 144) for the desktop management system 150 to generate false data for access in the one or more applications (e.g., 134, 144). For example, a user may select an email client platform (e.g., application 144), where the desktop management system 150 will generate false email messages for access in the email client platform using personal information of the user input at element 336. Element 350 may allow a user to configure the desktop management system 150 to enable a configuration of the false desktop system 140 as a read-only computing environment. For example, a user may select a read-only environment for "configuration_1" of the false desktop system 140, where the computing environment is read-only and does not allow for modification or alteration to any element of "configuration_1".

FIG. 4 shows an illustrative decision scenario table 400 where access to data resources is determined for users in accordance with one or more aspects described herein. In table 400, the "Login Name" may correspond to the specific login name input at the secure login 152. The "Security Key" may correspond to the specific security key input at the secure login 152. The "Access Result" may describe the result of the input entered at the secure login 152 (e.g., whether entering the input enabled the user operating system 130 and/or enabled a configuration of the false desktop system 140). The inputs of "login_1" with "password_1" at the secure login 152 may correspond to an "Access Result" of enabling and/or allowing access to the user operating system 130 and the associated user interface 138 at user computing device 102. The inputs of "login_2" with "password_2" at the secure login 152 may correspond to an "Access Result" of enabling and/or allowing access to "configuration_1" of the false desktop system 140 and the associated user interface 148 at user computing device 102. The inputs of "login_1" with "password_2" at the secure login 152 may correspond to an "Access Result" of enabling and/or allowing access to "configuration_2" of the false desktop system 140 and the associated user interface 148 at user computing device 102. As such, "login_1" may correspond to both the user operating system 130 and the "configuration_2" of the false desktop system 140, while "password_2" corresponds to both "configuration_1" and "configuration_2" of the false desktop system 140 at user computing device 102. The inputs of "login_3" with "password_3" at the secure login 152 may correspond to an "Access Result" of invalid access, where the combination of the inputs does not correspond to enabling and/or allowing access to the user operating system 130 and a configuration of the false desktop system 140 that has been configured at the configuration module 154. The inputs of "login_4" with "password_4" at the secure login 152 may correspond to an "Access Result" of enabling and/or allowing access to "configuration_3" of the false desktop system 140 and the associated user interface 148 at user computing device 102.

Figure 5:
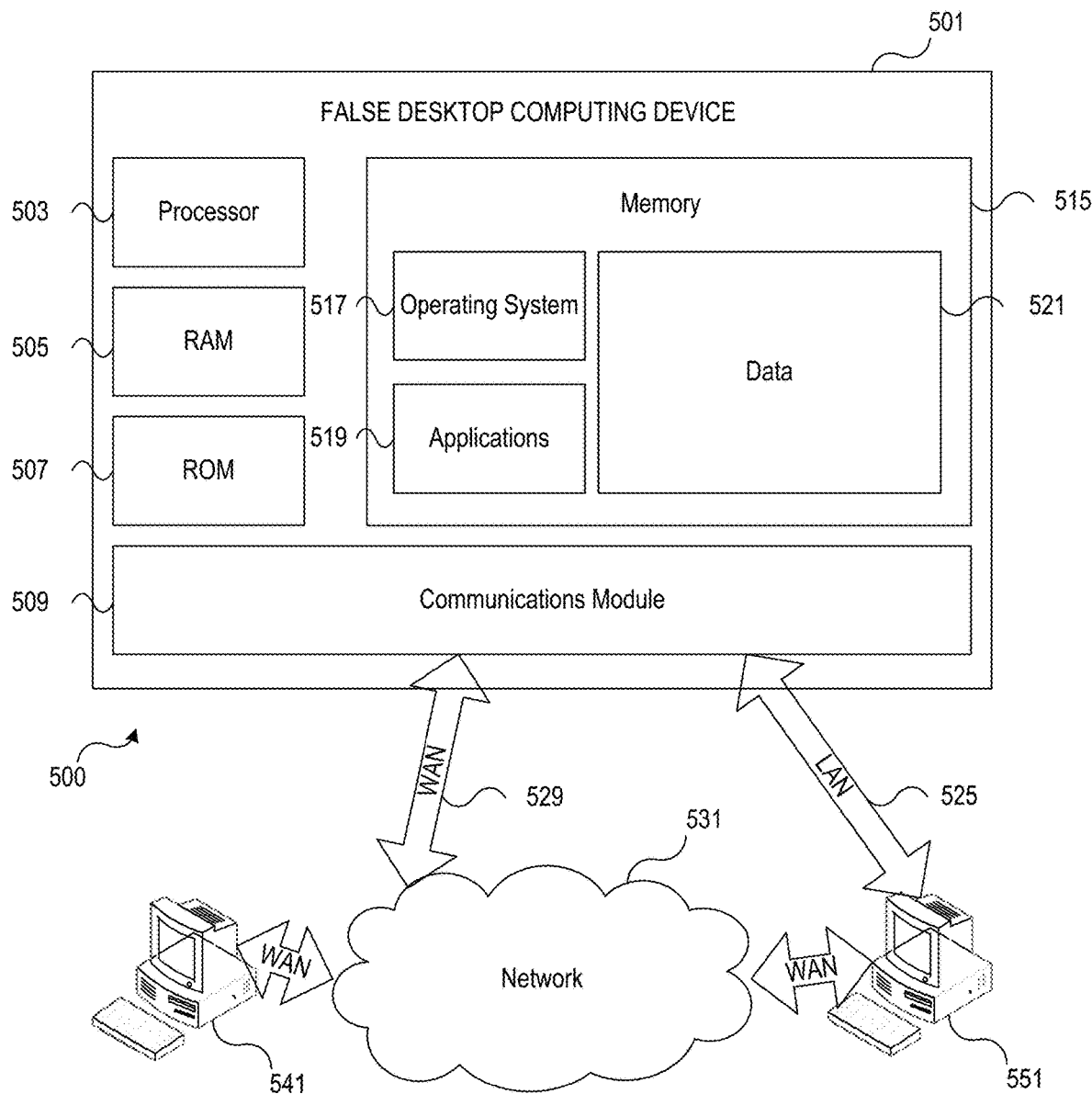
FIG. 5 shows an illustrative operation complexity graph operating environment in which various aspects of the disclosure may be implemented in accordance with one or more aspects described herein.

FIG. 5 shows an illustrative operating environment in which various aspects of the present disclosure may be implemented in accordance with one or more example embodiments. Referring to FIG. 5, a computing system environment 500 may be used according to one or more illustrative embodiments. The computing system environment 500 is only one example of a suitable computing environment and is not intended to suggest any limitation as to the scope of use or functionality contained in the disclosure. The computing system environment 500 should not be interpreted as having any dependency or requirement relating to any one or combination of components shown in the illustrative computing system environment 500.

The computing system environment 500 may include an illustrative false desktop computing device 501 having a processor 503 for controlling overall operation of the false desktop computing device 501 and its associated components, including a Random Access Memory (RAM) 505, a Read-Only Memory (ROM) 507, a communications module 509, and a memory 515. The false desktop computing device 501 may include a variety of computer-readable media. Computer-readable media may be any available media that may be accessed by the false desktop computing device 501, may be non-transitory, and may include volatile and nonvolatile, removable and non-removable media implemented in any method or technology for storage of information such as computer-readable instructions, object code, data structures, program modules, or other data. Examples of computer-readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the false desktop computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 503 of the false desktop computing device 501. Such a processor may execute computer-executable instructions stored on a computer-readable medium.

Software may be stored within the memory 515 and/or other digital storage to provide instructions to the processor 503 for enabling the false desktop computing device 501 to perform various functions as discussed herein. For example, the memory 515 may store software used by the false desktop computing device 501, such as a user operating system 517, one or more application programs 519, and/or an associated database 521. In addition, some or all of the computer executable instructions for the false desktop computing device 501 may be embodied in hardware or firmware. Although not shown, the RAM 505 may include one or more applications representing the application data stored in the RAM 505 while the false desktop computing device 501 is on and corresponding software applications (e.g., software tasks) are running on the false desktop computing device 501.

The communications module 509 may include a microphone, a keypad, a touch screen, and/or a stylus through which a user of the false desktop computing device 501 may provide input, and may include one or more of a speaker for providing audio output and a video display device for providing textual, audiovisual and/or graphical output. The computing system environment 500 may also include optical scanners (not shown).

The false desktop computing device 501 may operate in a networked environment supporting connections to one or more remote computing devices, such as the computing devices 541 and 551. The computing devices 541 and 551 may be personal computing devices or servers that include any or all of the elements described above relative to the false desktop computing device 501.

The network connections depicted in FIG. 5 may include a Local Area Network (LAN) 525 and/or a Wide Area Network (WAN) 529, as well as other networks. When used in a LAN networking environment, the false desktop computing device 501 may be connected to the LAN 525 through a network interface or adapter in the communications module 509. When used in a WAN networking environment, the false desktop computing device 501 may include a modem in the communications module 509 or other means for establishing communications over the WAN 529, such as a network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
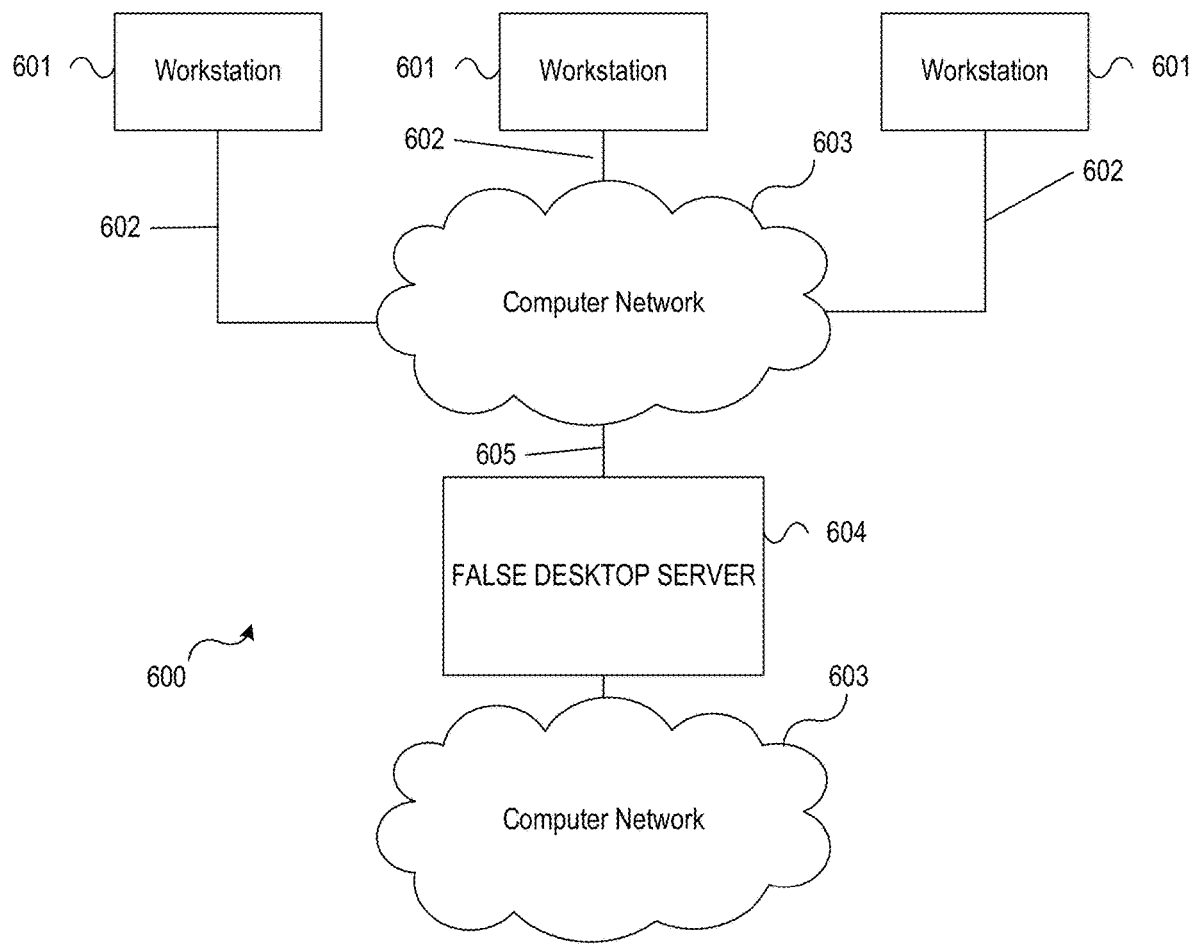
FIG. 6 shows an illustrative block diagram of workstations and servers that may be used to implement the processes and functions of certain aspects of the present disclosure in accordance with one or more aspects described herein.

FIG. 6 shows an illustrative block diagram of workstations and servers that may be used to implement the processes and functions of certain aspects of the present disclosure in accordance with one or more example embodiments. For example, an illustrative system 600 may be used for implementing illustrative embodiments according to the present disclosure. As illustrated, the system 600 may include one or more workstation computers 601. The workstation 601 may be, for example, a desktop computer, a smartphone, a wireless device, a tablet computer, a laptop computer, and the like, configured to perform various processes described herein. The workstations 601 may be local or remote, and may be connected by one of the communications links 602 to a computer network 603 that is linked via the communications link 605 to the false desktop server 604. In the system 600, the false desktop server 604 may be a server, processor, computer, or data processing device, or combination of the same, configured to perform the functions and/or processes described herein. The false desktop server 604 may be used to store the user operating system 130, false desktop system 140, and desktop management system 150, as well as execute the one or more functions described herein for these systems.

The computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 602 and 605 may be communications links suitable for communicating between the workstations 601 and the false desktop server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device.

The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
   at least one processor;
   a communication interface communicatively coupled to the at least one processor; and
   memory storing computer-readable instructions that, when executed by the at least one processor, cause the computing platform to:
      determine, by a location sensing device associated with the computing platform, a location of the computing platform;
      determine, based on the location of the computing platform and a use of a first security key or a second security key of a plurality of security keys, whether to enable a user operating system or a false desktop system as a default mode of the computing platform;
      enable, during a login to the computing platform and by a desktop management system, the default mode of the computing platform based on a received input of the first security key of a plurality of security keys;
      enable, during the login to the computing platform and by the desktop management system, a false desktop mode of the computing platform based on the received input of the second security key of the plurality of security keys, wherein the false desktop mode comprises one or more alternate security measures that each correspond to a different configuration of the false desktop system;
      generate, based on the login to the computing platform based on the second security key and based on user information associated with the first security key, false data for access in the false desktop system; and
      disable, based on use of the second security key, at least one system driver within the false desktop system.

2. The computing platform of claim 1, wherein the instructions, when executed by the one or more processors, cause the computing platform to:
   enable, during the login to the computing platform and by the desktop management system, a non-default mode of the computing platform based on a received input of a third security key of the plurality of security keys.

3. The computing platform of claim 1, wherein the instructions, when executed by the one or more processors, cause the computing platform to:
   configure, by a configuration module of the desktop management system, the false desktop system to restrict access to specified files, data stores, applications, and storage drives of the computing platform.

4. The computing platform of claim 1, wherein the instructions, when executed by the one or more processors, cause the computing platform to:
   configure, by a configuration module of the desktop management system, the false desktop system to restrict access to an external network communicatively coupled to the computing platform.

5. The computing platform of claim 1, wherein the instructions, when executed by the one or more processors, cause the computing platform to:
   configure, by a configuration module of the desktop management system, the false desktop system to disable specified ports associated with the computing platform.

6. The computing platform of claim 1, wherein the instructions, when executed by the one or more processors, cause the computing platform to:
   configure, by a configuration module of the desktop management system, the false desktop system to erase specified content located in a plurality of storage drives of the computing platform.

7. The computing platform of claim 1, wherein the instructions, when executed by the one or more processors, cause the computing platform to:
configure, by a configuration module of the desktop management system, the false desktop system to function as a read-only copy of the user operating system.

8. The computing platform of claim 1, wherein the instructions, when executed by the one or more processors, cause the computing platform to:
configure, by a configuration module of the desktop management system, a configuration of a plurality of configurations of the false desktop system, wherein the configuration of the false desktop system is configured by a user of the computing platform and by an enterprise organization associated with the computing platform.

9. A method, comprising:
determining, by a location associated device associated with a computing device, a location of the computing device;
receiving, via a user interface, one of a first security key or a second security key of a plurality of security keys;
configuring, based on the location of the computing device and a received one of the first security key or the second security key, one of a user operating system or a false desktop system as a default mode of the computing device;
activating, during a login to the computing device and by a desktop management system, the user operating system as the default mode of the computing device based on a received input of the first security key of the plurality of security keys; and
activating, during the login to the computing device and by the desktop management system, the false desktop system as the default mode of the computing device; and
generating, based on the activation of the false desktop system, false data appearing to be associated with a user corresponding to the first security key of the plurality of security keys; and
disabling, based on activation of the false desktop system, access to a proprietary software application.

10. The method of claim 9, comprising:
restricting, by the desktop management system and based on a login entry, access to specified files, data stores, applications, and storage drives of the computing device.

11. The method of claim 9, comprising:
restricting, by the desktop management system and based on a login entry, access of the computing device to an external network.

12. The method of claim 9, comprising:
disabling, by the desktop management system and based on a login entry, specified ports associated with the computing device, wherein the specified ports are disabled by modifying a plurality of system drivers associated with the specified ports.

13. The method of claim 9, comprising:
erasing, by the desktop management system and based on a login entry, specified content located in a plurality of storage drives of the computing device.

14. One or more non-transitory computer-readable media storing instructions that, when executed by a computing platform comprising at least one processor, memory, and a communication interface, cause the computing platform to:
determine, by a location sensing device associated with the computing platform, a location of the computing platform;
determine, based on the location of the computing platform and a use of a first security key or a second security key of a plurality of security keys, whether to enable a user operating system or a false desktop system as a default mode of the computing platform;
enable, during a login to the computing platform and by a desktop management system, the default mode of the computing platform based on a received input of the first security key of a plurality of security keys; and
enable, during the login to the computing platform and by the desktop management system, a false desktop mode of the computing platform based on the received input of the second security key of the plurality of security keys, wherein the false desktop mode comprises one or more alternate security measures that each correspond to a different configuration of the false desktop system and is populated with false data appearing to be associated with a user corresponding to the first security key.

15. The one or more non-transitory computer-readable media of claim 14, wherein the instructions, when executed by the one or more processors, cause the computing platform to:
enable, during the login to the computing platform and by the desktop management system, a non-default mode of the computing platform based on a received input of a third security key of the plurality of security keys; and
disable, based on use of the third security key, at least one system driver for a port within the non-default mode of the computing platform.

16. The one or more non-transitory computer-readable media of claim 14, wherein the instructions, when executed by the one or more processors, cause the computing platform to:
configure, by a configuration module of the desktop management system, the false desktop system to restrict access to specified files, data stores, applications, and storage drives of the computing platform.

17. The one or more non-transitory computer-readable media of claim 14, wherein the instructions, when executed by the one or more processors, cause the computing platform to:
configure, by a configuration module of the desktop management system, the false desktop system to disable specified ports associated with the computing platform.

18. The one or more non-transitory computer-readable media of claim 14, wherein the instructions, when executed by the one or more processors, cause the computing platform to:
configure, by a configuration module of the desktop management system, the false desktop system to erase specified content located in a plurality of storage drives of the computing platform.

* * * * *